United States Patent [19]

Turner

[11] Patent Number: 5,450,196
[45] Date of Patent: Sep. 12, 1995

[54] TIME-RESOLVED FOURIER-TRANSFORM OPTICAL SPECTROSCOPY UTILIZING IN-PHASE AND QUADRATURE CYCLIC PERTURBATION DATA VALUES

[75] Inventor: Andrew J. Turner, Buckinghamshire, England

[73] Assignee: Perkin-Elmer Limited, Buckinghamshire, England

[21] Appl. No.: 289,160

[22] Filed: Aug. 11, 1994

[30] Foreign Application Priority Data

Aug. 20, 1993 [GB] United Kingdom ............... 9317329

[51] Int. Cl.⁶ ............................................. G01B 9/02
[52] U.S. Cl. .................................... 356/346; 356/351
[58] Field of Search ........................ 356/345, 346, 351

[56] References Cited

U.S. PATENT DOCUMENTS 4,684,255  8/1987  Ford ..................... 356/346
5,196,903  3/1993  Masutani ............... 356/346

OTHER PUBLICATIONS

"Time-Resolved Spectroscopy of Stretched Polypropylene Films" by W. G. Fately and J. L. Koenig published in the Journal of Polymer Science 1982-pp. 445-452.

Primary Examiner—Samuel A. Turner
Assistant Examiner—Robert Kim
Attorney, Agent, or Firm—Edwin T. Grimes

[57] ABSTRACT

In FT-DIRLD (Dynamic Infra Red Linear Dichroism) apparatus partly represented in FIG. 1, units 100-105, responding to interferometer output IB (indicated elsewhere), cause unit 106 to yield an interferogram combining static and dynamic dichroism interferograms. Reference signals respectively in phase and quadrature with cyclic sample strain are derived from rheometer 102. At each OPD point of predetermined uninterrupted scans, controller 108 routes simultaneously a data point of the combined interferogram and the reference signals to respective channels of multiplexer 107. A microprocessor (shown elsewhere) subsequently performs a best-fit-to-an ellipse sorting of the data and for each OPD derives: A) the value of the interferogram unaffected by sample modulation; B) the corresponding in phase term; and C) the corresponding in quadrature term; furthermore, from the A, B,C data-point series it generates the interferogram of each series and transforms it into a spectrum. DIRLD analysis is achieved asynchronously and in continuous fast scanning.

18 Claims, 4 Drawing Sheets

TIME-RESOLVED FOURIER-TRANSFORM OPTICAL SPECTROSCOPY UTILIZING IN-PHASE AND QUADRATURE CYCLIC PERTURBATION DATA VALUES

FIELD OF THE INVENTION

This invention relates to apparatus for and method of time-resolved Fourier Transform optical spectroscopy, FT-IR (Fourier Transform-Infrared) in particular as examplified by its application to DIRLD (Dynamic Infra Red Linear Dichoism) spectroscopy.

BACKGROUND OF THE INVENTION

For a better understanding of the background from which the invention springs, but with no prejudice to the generalities expressed in the claims accompanying the present specification, the introduction which follows will relate to time-resolved FT-IR spectroscopy, which is becoming widely practised and shows a promising future.

In a non-time-resolved regular FT-IR spectrometer, introduced here by way of background information, an interferometer of the Michelson type splits a polychromatic input beam into a reflected beam and a transmitted beam by means of a beam splitter. Each split beam travels along its own path to a return mirror which deflects it back to the beam splitter along the same path. One of the return mirrors is stationary, whilst the other is movable along a rectilinear track between two mirror travel limits equidistant from a datum position therebetween. At the beam splitter, the two returned split beams recombine along a co,non output path leading to a photodetector via a sample station.

If the movable mirror is adjusted so that the optical path length from beam splitter to return mirror and from the latter back to the beam splitter is exactly the same for the two beams, i.e. if the movable mirror is located at its datum position, then the two halves of each constituent split optical wave, one half in one split beam and the other half in the other split beam, will undergo constructive interference, which means that respective wavefronts will overlap. In other words, at the datum position or, more specifically, zero OPD (Optical Path Difference) position, all the constituent waves of the input beam which were split by the beam splitter will recombine simultaneously, as shown by the dominant signal produced by the photodetector. This intense signal is referred to in the art as the centreburst.

If the movable mirror is now shifted towards the incoming split beam, the optical path length "seen" by the movable mirror is decreased; conversely, it will be increased if the mirror is moved in the opposite direction. A mirror travel from one to other limit will therefore generate two complete series of OPD values of opposite signs, as required for Fourier transformation, presently to be introduced. Such travel is referred to as an OPD scan. Each OPD change from the zero OPD position of the movable mirror corresponding to one half wavelength of a constituent optical wave will produce a sinusoidal optical modulation of the wave varying at recombination from a maximum when the two split waves are in phase (constructive interference) to a minimum when they are in phase opposition (destructive interference). In terms of the photodetector signal, it means that as the OPD scan proceeds a series of superimposed electrical sine waves will be generated of different frequencies (known as Fourier frequencies) and amplitudes. That signal represents an interferogram.

So far no reference has been made to the presence of a sample at the sample station. If a sample is inserted, the interferogram taken is that of the sample superimposed on that of the source. If no sample is inserted, the resulting interferogram is that of the source, of course. By taking the Fourier Transform of the former interferogram and, separately, that of the latter and ratioing the two transforms, the spectrum of the sample is obtained.

It is desirable to emphasize that an interferogram is sampled as a series of elemental data (hereinafter data points) and the OPD scan from mid-scan to either scan limit is divided into a corresponding series of equal OPD increments (hereinafter OPD points), each in coincidence with a zero crossing of a reference laser interferogram. A data point occurring at a given position in the series of data points is always sampled at the OPD point occupying the same position in the series of OPD points. Thus data point 1 is always sampled at OPD point 1, data point 2 at OPD point 2, and so on.

Fuller background details are contained in the introduction to U.S. Pat. No. 4,684,255, which is imported in full into this specification and is hereinafter referred to as Imported Patent.

Time-resolved FT-IR spectrophotometers are known in which to the multiple modulation covering a band of Fourier frequencies provided by the interferometer (hereinafter referred to as interferometer modulation) in translating each optical wave present in the interferometer input beam into an electrical sine wave, the amplitude and frequency of which are related to amplitude and frequency of the optical wave, there is added a cyclic stretching and relaxing of the sample in the shape of a thin strip by means of a rheometer. These mechanical cyclic perturbations are hereinafter referred to as sample modulation. Depending on the nature of the sample, the perturbations may cause changes in certain constituent dipole moments of a molecule and, consequently, in the dipole moment of the molecule as a whole.

Whenever the dipole moment of a molecule changes, absorption takes place. The change in dipole moment brought about by sample modulation may be regarded as "dynamic" absorption to distinguish it from the "static" absorption of conventional FT-IR spectroscopy, wherein an unperturbed sample is used. By accumulating data at each successive OPD points of an OPD scan by the interferometer which synchronize with sample strain resulting from the stress applied by the cyclic perturbations, it is possible to derive a spectrum on the time-dependence of absorbance, which when compared with the static spectrum provides information useful in the interpretation of the latter e.g. in resolving a featureless absorbance band into a number of constituent peaks.

Another well known FT-IR technique is concerned with Infra Red Linear Dichroism (IRLD). Samples that absorb light differentially between two orthogonal components of linearly polarized light are said to exhibit dichroism. This effect occurs naturally in certain crystalline materials, such as tourmaline, and may be induced by stretching in others, such as atactic polystyrene. In this specification, the phrase dichroic sample shall be understood to refer to a sample in which dichroism is either natural or induced.

In regular IRLD, an ultrasonic photo-elastic modulator, referred to as the PEM, causes an interferometer output beam that has been linearly polarized to alternate between two orthogonal linearly polarized states at an ultrasonic frequency. The sample is so orientated that its dichroic axis is either parallel or perpendicular to the modulation axis of the PEM. As it passes through the sample, the polarization modulated beam is differentially absorbed between the two orthogonal polarization states. A detector receiving the emerging beam yields an electrical output in which a wave at the ultrasonic polarization frequency appears atop a waveform representing the emission interferogram of the interferometer source compounded with the regular IR absorbance interferogram of the sample. The linear dichroism difference information is contained in the modulation of the ultrasonic wave. The "envelope" of this modulation may be extracted and processed by known means to provide the linear dichroism difference spectrum of the sample.

Another FT-IR technique results from the combination of polarization modulation with sample modulation. It is known as DIRLD, which stands for Dynamic Infra-Red Linear Dichroism, in contradistinction to IRLD which may be thought of as "static" IRLD. Now the modulation of the ultrasonic wave in the detector output contains information on dichroism components respectively in phase and in quadrature with sample strain. This information may be extracted by known methods and displayed as dynamic dichroic difference spectra side by side with the static dichroic difference spectrum of the sample.

In the application of the prior art FT-DIRLD technique the aim has been to establish the time dependence of absorbance in a dichroic sample. It was soon realized that if the interferometer band of modulation frequencies was too closely spaced from the sample modulation frequency, sidebands of the former would interfere with certain frequencies within the said band. Unfortunately, the obvious remedy of distancing the sample modulation frequency sufficiently to avoid interference effects was not available because the choice of such frequency is governed by the requirements of the analysis to be undertaken and the nature of the sample. The answer was to replace continuous OPD scanning by step scanning. It has meant: stopping the scan at the first OPD point of a complete scan for the duration of one cycle or more of the sample modulation; sampling the interferogram for various phase angles of the or each sample modulation cycle; repeating the process at each subsequent OPD point until completion of the scan; and analyzing the data.

Unfortunately, the step scanning system required hitherto is complex and therefore expensive; more importantly, OPD scanning can take several hours and no spectra is produced till the very end. The prior art solution avoids the interference problem referred to earlier but incurs a severe penalty. Not being able to use the fast scan facilities is also a serious drawback in time resolved FT spectroscopy.

SUMMARY OF THE INVENTION

In accordance with one aspect of the present invention there is provided a time-resoved FT optical spectrophotometer, comprising:
a) a Michelson-type interferometer;
b) a photodetector for co-operating with the interferometer in producing an electrical output of interferomtric data;
c) means for introducing cyclic perturbations which permit the time dependence of a parameter that in operation will be subjected to analysis to be evaluated from their effect on the interferometric data.
d) signal generating means for generating a reference signal in phase with the cyclic perturbations and a reference signal in quadrature with the perturbations;
e) means for reading the interferometric data and the reference signals at each OPD point of the interferometer over a sequence of interferometer scans; and
f) means for computing at each OPD point from the interferogram and reference signals readings certain parameters defining the time dependence of the parameter under analysis and for generating the spectra of said parameters.

Means may be provided for arranging the read data as a best fit to a model such that, when such fit is obtained, a series of read interferogram data points is obtained each of which is correctly correlated to the phase angle of the in phase reference signal at which it occurred as a result of the perturbations, whereby from the read interferogram a derived interferogram may be generated representing the demodulated in phase component of the read interferogram.

Means may also be provided for arranging the read data as a best fit to a model such that, when such fit is obtained, a series of read interferogram data points is obtained each of which is correctly correlated to the phase angle of the in quadrature reference signal at which it occurred as a result of the perturbations, whereby from the read interferogram a derived interferogram may be generated representing the demodulated in quadrature component of the read interferogram.

The best fit model may be an ellipse.

The means for introducing cyclic perturbations may be adapted to cause mechanical or electrical perturbations or, indeed, of any other nature that will permit the stated function to be performed.

The parameter under analysis may be a system parameter, such as, for example, the emission spectrum of an electro-fluorescent lamp system, or a parameter, such as linear dichroism, of a regular analytical sample.

Means may be provided for subjecting the analytical sample to cyclic mechanical perturbations such as in the form of cycles of alternate stretching and relaxing to establish the time dependence of a parameter of the sample, e.g. light absorbance.

A rheometer may be used to create cyclic stretching and relaxing, in which case the strain gauge associated with such instrument may constitute the means for providing the reference signal in phase with the cyclic perturbations and the in quadrature reference signal may be derived from the thus obtained in phase reference signal by means of a device capable of introducing a 90-degree phase shift.

The FT optical spectrophotometer may further include a linear polarizer followed by an ultrasonic photoelastic modulator to adapt the spectrophotometer for time resolved spectroscopy in accordance with the DIRLD (Dynamic Infrared Linear Dichroism) technique.

In accordance with another aspect of the present invention there is provided a method of FT spectrosopy for evaluating the time dependence of a parameter under analysis, comprising the steps of:
  a) subjecting the parameter to interferometric analysis as in regular FT spectroscopy for the generation of interferometric data;
  b) introducing cyclic spectroscopic perturbations that permit the time dependendence of the parameter to be evaluated from their effect on the interferometric data;
  c) generating two reference signals, one in phase and one in quadrature with the cyclic perturbations;
  d) reading the interferomtric data and the reference signals at each interferometric OPD point over a sequence of OPD scans;
  e) computing in correspondence of each OPD point from readings of the interferogram produced by the interferometric analysis as modified by the cylic perturbations and from readings of the reference signals certain parameters defining the time dependence of the parameter under analysis; and
  f) generating the spectra of said parameters.

The read data may be arranged as a best fit to a model such that, when such fit is obtained, a series of read interferogram data points is obtained each of which is correctly correlated to the phase angle of the in phase reference signal at which it occurred as a result of the perturbations, whereby from the read interferogram a derived interferogram may be generated representing the demodulated in phase component of the read interferogram.

Furthermore, the read data may be arranged as a best fit to a model such that, when such fit is obtained, a series of read interferogram data points is obtained each of which is correctly correlated to the phase angle of the in quadrature reference signal at which it occurred as a result of the perturbations, whereby from the read interferograma derived interferogram may be generated representing the demodulated in quadrature component of the read interferogram.

The best fit model may be an ellipse.

Both in terms of apparatus and method the present invention leads to many varied applications. It may, for example, enable a time dependent parameter to be segregated so that certain undesired effects may be eliminated, e.g. thermal background in the measurement of Raman scatter.

DETAILED DESCRIPTION OF THE INVENTION

Figure 1:
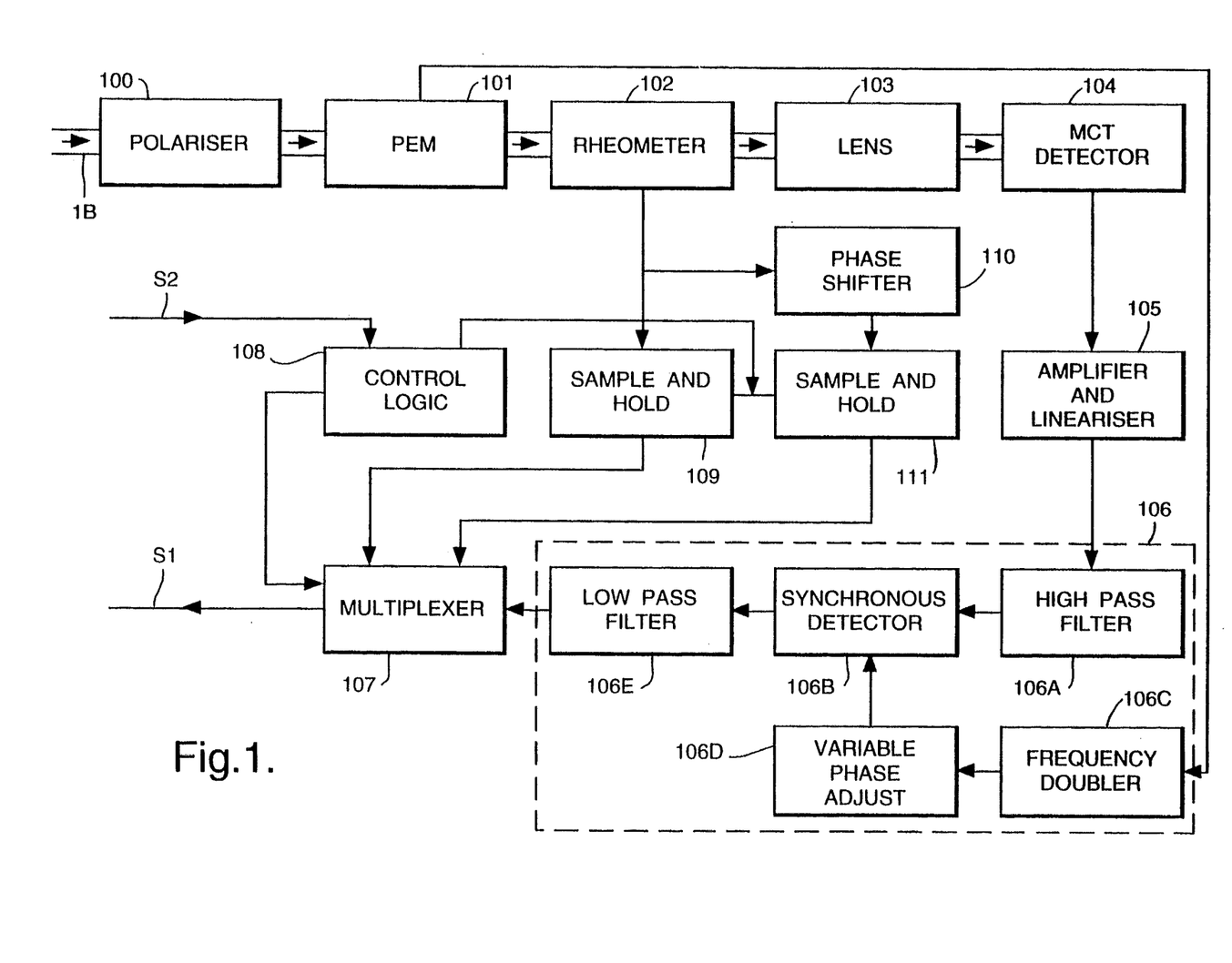
FIG. 1 is a block diagram of apparatus that cooperates with the FT spectrophotometer from the Imported Patent in the realization of an embodiment of a time-resolved FT spectrophotometer adapted for the application of the DIRLD technique.

In the DIRLD apparatus shown diagrammatically in FIG. 1, the recombined beam originating from scanner 13 that has emerged from parabolic mirror 22, both shown in FIG. 4 (see also FIG. 5) of the Imported Patent, identifies with beam IB, having by-passed the sample in carrier 23, the elliptical mirror 24, and detector 9, all of which are substituted in FIG. 1 of the present specification by parts which, although performing a generally similar function, differ in their physical characteristics from the substituted parts, as will be presently appreciated.

Beam IB successively traverses a polarizer 100, a photo-elastic polarization modulator 101 (hereinafter referred to as the PEM), a rheometer 102 for subjecting a sample in the form of a thin film to cycles of stretching and relaxing, and a focussing lens 103 for projecting an image of the Jaquinot stop 2A (FIG. 4 of Imported Patent) onto a photoconductive MCT (mercury-cadmium-telluride) detector 104. The rheometer 102 with a sample fitted to it is reminiscent of the discarded sample carrier 23 in FIG. 4 of the Imported Patent, in so far as the sample carrying function is concerned; but there the similarity ends, except that it too must be so mounted that an image of the Jaquinot stop 2A (FIG. 4 of Imported Patent) is formed at, or in close proximity to, the sample plane.

The electrical output of the MCT detector 104 is extended, via amplifier-cum-linearizer 105, to lock-in amplifier 106 comprising a high-pass filter 106A feeding into a synchronous detector 106B which receives a 74 kH signal from a frequency doubler 106C via a phase adjuster 106D. The input to the frequency doubler 106C is a 37 kHz phasing signal from the PEM 101. The output of the synchronous detector 106B feeds, via a low pass filter 106E, into a multiplexer 107 controlled by control logic 108, which in turn responds to an input, referenced Hd, from the signal pulse generator 50 shown in FIG. 7 of the Imported Patent. The output of the multiplexer 107, referenced S1, is linked, via sample and hold unit 44, to the input of ADC (analogue-to-digital converter) unit 45 (FIG. 7 of the Imported Patent), which is triggered in parallel with the control logic 108 by trigger pulse generator 50 (FIG. 7 of the Imported Patent).

The multiplexer 107 receives two further inputs, each representing a reference signal: a first sinusoidal (cosine) signal from a strain gauge within the rheometer 102, via sample and hold device 109, in phase with the strain suffered by the sample when subjected to cyclic stretching and relaxing; and a second sinusoidal (sine) signal, also originating from the strain gauge, via a 90-degree phase shifter 110 and sample and hold device 111. The two signals provide therefore two references respectively in phase and in quadrature with the cyclic sample strain. Devices 109 and 111 act simultaneously in response to control logic 108.

All the optical and electronic units introduced hereabove with reference to FIG. 1 are well known in the optical and electronic arts, respectively, and are available commercially. The information which follows on a few of them is offered in the interest of a ready understanding of the invention.

The purpose of polarizer 100, a silver bromide wire-grid unit, is to provide linear polarization of beam IB in the direction of the strain caused in the sample by the rheometer 102. In FIG. 1 it is assumed that the sample is being stretched and relaxed in a vertical direction. Therefore, the chosen plane of polarization of the polarizer 100 is vertical.

Figure 1A:
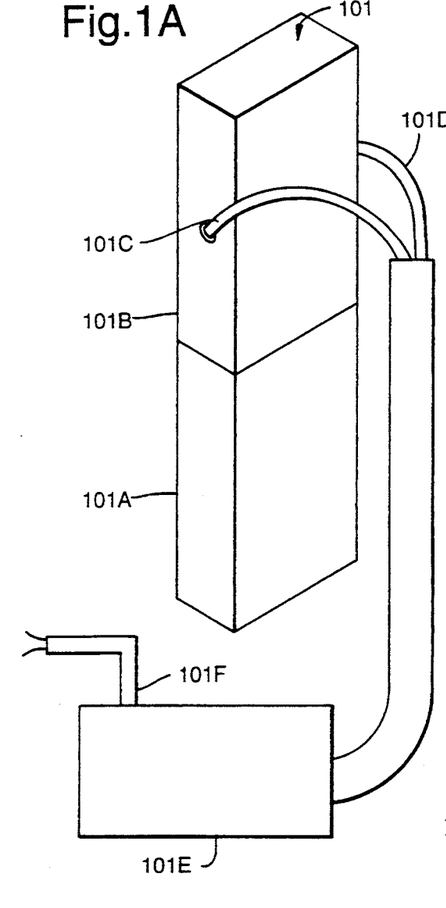
FIG. 1A is a simplified drawing of a prior art photoelastic modulator included in the embodiment.

The function of the PEM 101 is to switch the plane of polarization from vertical to horizontal in a cyclic manner. The input beam IB is, therefore, alternately polarized in directions parallel and normal to the strain direction of the sample. The PEM 101 used in this embodiment is an instrument marketed as the "PEM-90" photo-elastic modulator by Hinds Instruments Inc., of 5250, NE Elam, Young Darkway, Hillsboro, Oreg. 97124-6463, U.S.A. It is based on a ZnSe plate 101A (FIG. 1A) in which strain induced birefringence is generated by an ultrasonic piezo-electric transducer 101B acting on the top edge of the plate 101A. The transducer 101B is energized via conductors 101C and 101D from a control unit 101E. The operating frequency of the transducer 101B is 37 kHz, and since the polarization vector is being switched twice per cycle, the polarization modulation frequency of beam IB is 74 kHz. The control unit 101E makes available a 37 kHz phasing signal to the frequency doubler 106C (FIG. 1) via cable 101F.

The PEM 101 enables a linear dichroic difference signal to be monitored on a continuous basis via MCT detector 104. The signal is the result of the difference between the absorbance exhibited by the sample when the polarization vector is vertical and that when the vector is horizontal. When the sample is subjected to cycles of mechanical stretching and relaxing, as in the present embodiment, the linear dichroic difference of the sample undergoes changes with the result that the static dichroic difference signal due to the polarization modulation is modulated by the dynamic dichroic difference signal caused by mechanical sample modulation.

Figure 1B:
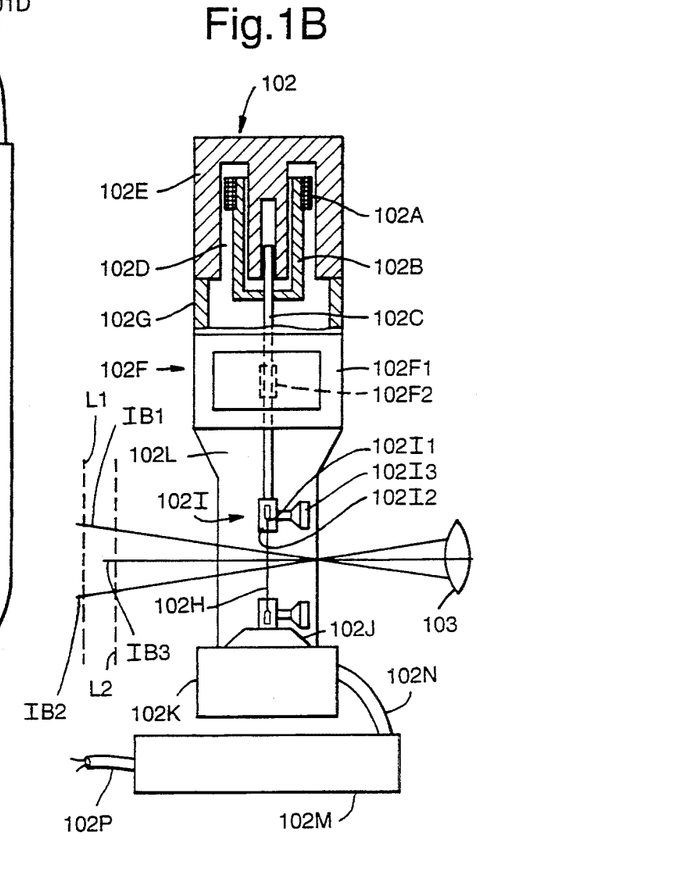
FIG. 1B is a simplified drawing of a prior art rheometer included in the embodiment.

The rheometer 102 is marketed by the by the Perkin-Elmer Corporation, of 761 Main Avenue, Norwalk, Conn. 06859-0181, U.S.A. as a DMA7 Dynamic Mechanical Analyzer, of which simplified basic details are shown diagrammatically in FIG. 1B. The instrument comprises an electromagnetic drive reminiscent of the well know moving-coil loudspeaker arrangement, in that it comprises a coil of copper wire 102A wound on a cylindrical non-magnetic former 102B attached to a non-magnetic red 102C free to move in the vertical direction only, the coil 102A and a portion of its former 102B being located within the annular gap 102D of a generally cylindrical magnet 102E.

An electrical strain gauge 102F, comprising differential transformer indicated at 102F1, co-operating with soft-iron core 102F2, carried by rod 102C, monitors sample strain. The strain gauge 102F is spaced from the magnet 102E by a cylindrical spacer 102G.

The coil 102A is electromagnetically displaced towards the magnet 102E or away from it with a force and in a direction depending on the intensity and direction, respectively, of a DC current passed through it. If the current is AC, as it is for the purposes of the present embedment, the coil oscillates in sympathy therewith and, therefore, the strain gauge produces a sinusoidal output.

The end of the rod 102C is provided with means for clamping one end of a sample 102H in the form of a strip cut from a thin foil. In FIG. 1B the said means are simplified in order merely to illustrate the function. As shown, they consist of a clamp 102I comprising arms 102I1 and 102I2 that are sprung apart by a small gap when the clamping screw 102I3 is released. The sample 102H is fitted by first inserting one end thereof into the gap and then tightening the screw 102L3 to force the arms 102I1 and 102I2 to close with the sample end compressed therebetween. A clamp similar to clamp 102I is fitted to a plinth 102J, extending from a base 102K of the rheometer 102, and serves the purpose of providing an immovable attachment for the other end of the sample 102H.

The rheometer 102 is capable of subjecting sample 102H to sinusoidal stress changes in the longitudinal direction thereof ranging in frequency from 0.01 Hz to 51 Hz. A constant bias stress may be applied to the sample 102H by passing a constant DC current through the coil 102A. The total stress applied is kept within the elastic limit of the sample.

The magnet 102E, the cylindrical spacer 102G and the strain gauge 102F represent the head parts of the rheometer 102, which parts are firmly supported by the base 102K via an intervening vertical pillar 102L. A controller 102M, shown in front elevation, controls the current passing through coil 102A and receives a sinusoidal strain signal from the strain gauge 102F. In FIG. 1 this reference signal, in phase with sample strain, is passed to the sample and hold unit 109, as the arrow-headed functional route line shows. It is also passed to phase shifter 110 to generate a reference signal in quadrature with sample strain. The importance of these reference signals will be presently appreciated. The electrical connections between the head of rheometer 102 and the controller 102M are provided by conductors (not seen) which extend into cable 102N entering the controller 102M. The reference signal in phase with cyclic sample strain is extended to unit 109 (FIG. 1) via cable 102P.

The rays IB1 and IB2 shown in FIG. 1B represent the marginal rays from the parabolic mirror 22 (FIG. 7 of Imported Patent) passing through planes L1 and L2, whereat the mid planes of polarizer 100 and the PEM 101, respectively, are located. Ray IB3 is the principal ray, of course. The sample 102H is located at the image plane of parabolic mirror 22, whereat an image of the Jaquinot stop 2A (FIG. 7 of Imported Patent) is projected. The lens 103 re-images the Jaquinot stop image onto the MCT detector 104.

The lens 103, a ZnSe lens, is the refractive counterpart of elliptical mirror 24, shown in FIG. 4 of the Imported Patent. The choice of a refractive element avoids the undesirable polarization effects of a reflective element.

The photoconductive MCT detector 104 is a liquid-nitrogen cooled unit marketed by Grasby Infrared Ltd., of Exning Road, Newmarket, Suffolk. Detectors with a poor frequency response in the ultrasonic frequency range are not suitable for DIRLD.

The lock in amplifier 106 is marketed as the LX10 Lock-in Amplifier by Barman Instruments, of Leys Lane, Shipsea, Driffield, East Yorkshire, UK, except that additional passive input filtering has been provided to remove the low frequency unmodulated components in the signal which could otherwise break through into the required output. Additional filtering has also been provided for the output of the synchronous detector 106B to remove residual components at 74 kH and harmonics thereof whilst providing a bandwidth of several kilohertz for the demodulated signal.

The remainder of the units do not require singling out for further description.

In operation, the beam IB, plane polarized in the direction of sample strain by polarizer 100, is polarization modulated by the PEM 101 at an ultrasonic frequency of 74 kHz. If a dichroic sample is fitted to the rheometer 102 but the rheometer 102 is inoperative while OPD scanning is in progress, the output of MCT detector 104 will comprise the compounded emission interferogram of the source and transmission of the sample surmounted by modulated 74 kHz oscillations, the "envelope" of the modulation representing the interferogram of linear dichroism of the sample observed in the course of the OPD scan.

If the rheometer 102 is now activated, the cyclic stretching and relaxing of the sample will cause changes in the differential absorption (i.e. dichroism) of the sample which are due to mechanically induced changes in the dipole moment of the sample molecules. This means that the interferogram of linear dichroism will now be modulated by a signal arising from the co-action between the modulation provided by the interferometer and the sample modulation.

In the embodiment of FIG. 1, the sample modulation range that may be applied is between 1 Hz and 50 Hz, but the DIRLD that is being described could accept a much wider range.

The output of detector 104 reaching the synchronous detector 106B via the amplifier and linearizer 105 and the high pass filter 106A comprises only the modulated 74 kHz signal since the high pass filter 106A holds back the Fourier-frequency signals representing the compounded emission interferogram of the source and transmission of the sample. The synchronous detector 106B, supplied by cable 101F (FIG. 1A) with a 37 kHz signal from the control unit 101E (FIG. 1A) of the PEM transducer 101B (FIG. 1A), via frequency doubler 106C, and variable phase adjust 106D, extracts the modulated "envelope" of the 74 kHz signal. The low pass filter 106E now removes any traces of the 74 kHz signal and harmonics thereof, but its bandwith is sufficient to prevent any impairment of the signal extracted by the synchronous detector 106B.

The output from the lock-in amplifier 106 includes, in the form of a "combined" interferogram, the static (i.e. unmodulated by the rheometer 102) dichroism interferogram of the sample and the dynamic dichroism interferogram associated with sample strain changes that occurred during the time the interferogram was being produced. The term "combined" is intended to convey that the constituent interferograms are not yet resolved.

Data processing of the combined interferogram referred to hereabove now begins, the data involved being handled in three separate channels. Channel 1 is dedicated to the data provided by the combined interferogram. Channel 2 is dedicated to the reference signal in phase with the cyclic sample strain. Channel 3 takes care of the reference signal in quadrature with sample strain.

The in phase reference signal is sampled by sample and hold device 109 and the in quadrature reference signal by sample and hold device 111, and control logic 108 ensures that the said devices are triggered at the same instant in which the combined interferogram signal is sampled in the first channel. The three simultaneously sampled values are admitted to the multiplexer 107, wherein each data point of the sampled combined interferogram is accompanied in the multiplexer 107 by the phase information appertaining to it.

The time coincidence of sampling as stated is fundamentally important in the data processing to follow, aimed at extracting components of the combined interferogram respectively in phase and quadrature with sample strain, thus generating the in phase components interferogram and the in quadrature components interferogram, from which the respective spectra are derived in known manner by the application of Fourier Transform.

Details of how the time coincidence is achieved will now be given. The control logic 108 (FIG. 1) initially sets the multiplexer 107 to select the input from the low pass filter 106E of the lock-in amplifier 106, and places both sample and hold devices 109 and 111 to sampling mode (also known as tracking mode).

On the first pulse of the trigger pulse generator 50 (FIG. 7 of Imported Patent) the sample and hold device 44 is set to hold mode and a conversion cycle on the ADC 45 is started, with the ADC converting the signal from the low pass filter 106E as held by sample and hold device 44. At the same time, sample and hold devices 109 and 111 are also switched to their hold position.

Once the ADC unit 45 has completed its cycle, sample and hold device 44 returns to sampling mode and the multiplexer 107 is switched to select the output from sample and hold device 109.

On the second pulse from the trigger pulse generator 50, the sequence is repeated, except that sample and hold devices 109 and 111 remain in the hold mode throughout, with the ADC unit 45 reading the reference signal held by sample and hold device 109. At the end of this cycle, the multiplexer 107 is switched to select the output from sample and hold device 111.

On the third pulse from the trigger pulse generator 50, the sequence is repeated once more, with sample and hold devices 109 and 111 still in hold mode and the ADC unit 45 reading the other reference signal, held by sample and hold device 111. At the end of this conversion, the initial state is restored, with the multiplexer 107 selecting the output from the low pass filter 106E and all sample and hold devices returned to the sampling mode ready to repeat the complete cycle.

The process as described enables the ADC unit 45, and hence the microprocessor 46, to read from the three signal channels in turn, while the sample and hold devices 109 and 111 ensure that all three are sampled at the same time.

The three analogue signals per data point of the combined interferogram in the multiplexer 107, respectively in first, second and third channel, are read off channel by channel by the ADC unit 45 (FIG. 7 of Imported Patent) and are subsequently stored in the memory of the microprocessor 46 (FIG. 7 of the Imported Patent), whereby at the end of a complete single direction OPD scan a set of three numbers per data point is accumulated, the number from the first channel representing a data point of the combined interferogam; that from the second channel, the corresponding in phase angle of sample strain; and that from the third channel, the corresponding in quadrature angle of sample strain.

Figure 2:
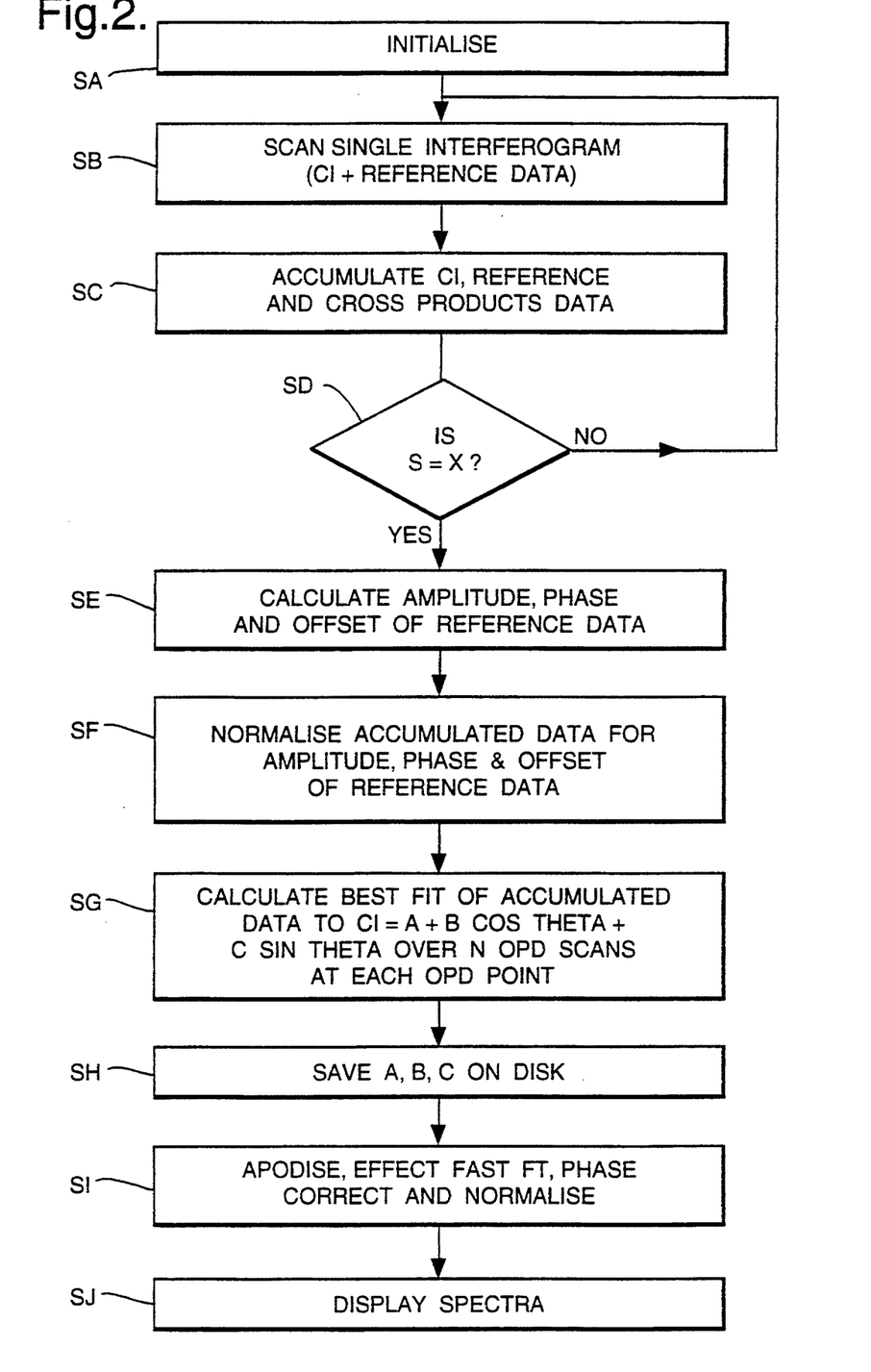
FIG. 2 is a flow chart of the data processing involved in the performance of the best fit method.

At this juncture the sequence of processing steps is best illustrated with reference to the flow chart of FIG. 2, wherein and hereinafter CI stands for "combined interferogram").

After initialization at SA, via microprocessor 46 (FIG. 7 of the Imported Patent) of the FT spectrophotometer of the Imported Patent as modified in accordance with the present embodiment, a single OPD scan is executed at SB by the interferometer of the Imported Patent, and at SC the set of three numbers per data point referred to earlier is accumulated in the memory of the microprocessor 46. In addition, various cross products are calculated from the three sets of data accumulated after each scan and the values added to the corresponding values accumulated from previous scans. Details of the actual parameters accumulated are given below.

$\Sigma_I$=sum of CI data values $\Sigma_c$=sum of in phase reference values $\Sigma_s$=sum of in quadrature reference values $\Sigma_c^2$=stun of square of in phase reference values $\Sigma_s^2$=sun of square of in quadrature reference values $\Sigma_{cs}$=sum of product of in phase and in quadrature reference values $\Sigma_{Ic}$=sum of product of CI and in phase reference values $\Sigma_{Is}$=sum of product of CI and in quadrature reference values At the end of the single scan, a counter is set to 1 at SD, is compared with the number of scans requested above a minimum of 3 and, if S is not equal to X, a further iteration is requested, as indicated by the loop shown. When S=X, the process advances to SE.

At SC additional data, in the form of third and fourth order cross products, were also accumulated for the reference data, this time single values covering all scans and OPD points. From this the amplitude, DC offset and please difference of the two reference signals are calculated by a least squares error fit method. The main accumulated scan data is then normalized at SF for the effects of amplitude and offset of the two reference signals and any phase error in the quadrature reference.

The main processing takes place at SG. It involves finding at each OPD the parameters A,B,C which define the sample modulation dependency of the combined interferogram with the least squares error fit to the observed data. This involves the solution of three simultaneous equations, details of which are given below.

$$\begin{bmatrix} A \\ B \\ C \end{bmatrix} = \begin{bmatrix} n & \Sigma c & \Sigma s \\ \Sigma c & \Sigma c^2 & \Sigma sc \\ \Sigma s & \Sigma sc & \Sigma s^2 \end{bmatrix}^{-1} \times \begin{bmatrix} \Sigma I \\ \Sigma Ic \\ \Sigma Is \end{bmatrix}$$

$n$ = numbers of scans

Figure 3:
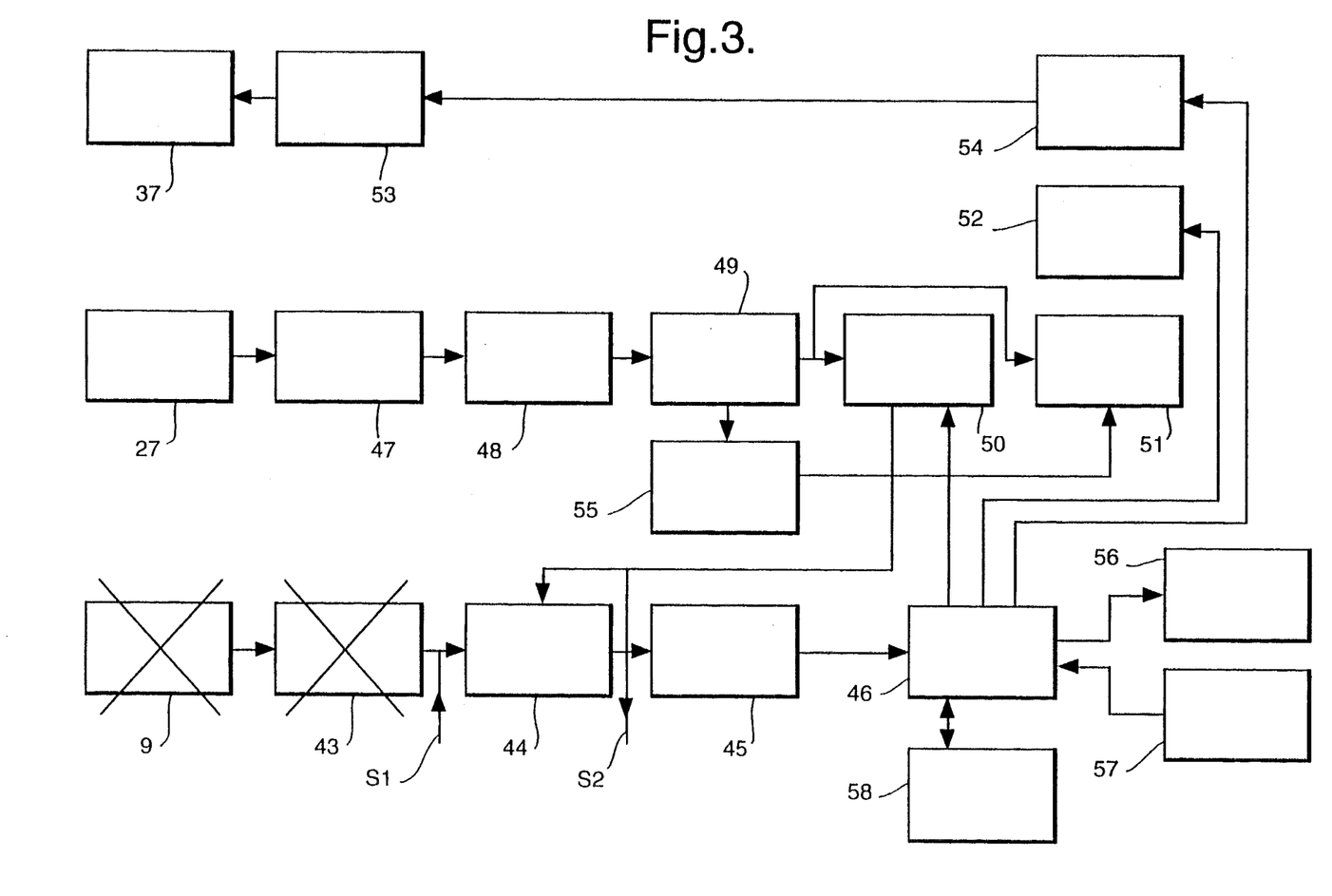
FIG. 3 represents FIG. 7 (Imported Patent) as modified for the purposes of the embodiment.

The coefficients of these equations are the values from the scan data accumulations. The resulting calculated parameters are formed into three new interferograms, corresponding to the average unmodulated value (A), the value in phase with modulation (B) and the value in quadrature with the data (C), which are saved on disk at SH and converted to spectra at SJ using normal FT-IR algorithms at SI. The disk is a hard disk contained in the hard disk unit 58 which has been added to the system of FIG. 7 of the Imported Patent as shown in FIG. 3 of this specification.

The operation indicated at SG is based upon a model which assumes that the con, non interferogram CI is represented by the sum of three components: one in phase with sample modulation, one in quadrature with sample modulation and a constant term, as expressed below:

$$CI = A + B \times \cos\text{ theta} + C \times \sin\text{ theta}$$

where

A is the constant term, i.e. the linear dichroic difference interferogram unaffected by sample modulation;

B is the in phase term and

C is the in quadrature term.

Theta is the phase angle value of the cyclic perturbations.

The object is to find at each OPD point the best fit of the CI data to the model. Since the equation on which the model is based defines an ellipse, what is required is a best fit to an ellipse. This is achieved by finding the least squares fit to an ellipse of the CI data collected from the desired number of OPD scans.

Figure 1C:
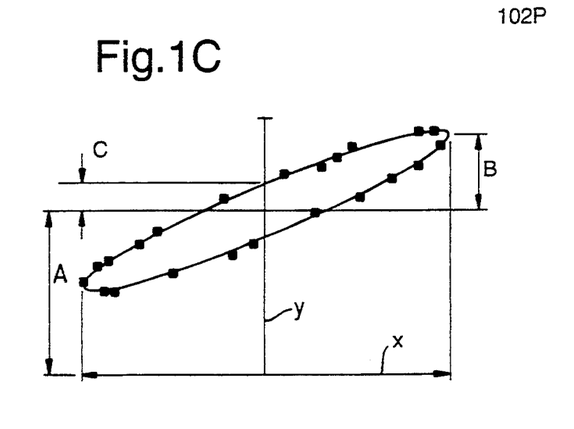
FIG. 1C is and X-Y plot of data illustrating a best fit method forming part of the embodiment.

A graphical illustration of the process is shown in FIG. 1C, wherein CI values at each OPD are plotted as the ordinate Y against the in phase signal derived from the rheometer as the abscissa X. As FIG. 3 shows, the shape and orientation of the ellipse is determined by A, B, and C which have been obtained at SG (FIG. 2) in the manner described hereabove.

It is now clear that the best fit process executed by the microprocessor 46 of the Imported Patent, which fundamentally relies on the two hardware generated reference signals, one in phase and the other in quadrature with sample strain, provide the proper co-ordination in time of the interferometric data regardless of the scanning speed of the interferometer or the rate differential between OPD scanning and mechanical sample modulation. The interferometer may therefore be operated up to the high limit of the speed range for which it was designed and the sample modulation frequency can be safely chosen to suit the sample and the nature of the analysis.

The embodiment described is an example of a time-resolved FT spectrophotometer in accordance with the invention which can be used in the continuous fast scanning mode independently of any chosen frequency of the cyclic perturbations, such as sample modulation, up to just above or just below the band of Fourier frequencies.

The foregoing description inherently provides the disclosure of a method of FT optical spectroscopy in accordance with the invention.

I claim:

1. A time-resolved Fourier Transform optical spectrophotometer comprising:
    a) a source of photometric radiation;
    b) a Michelson-type interferometer adapted for splitting an input beam from the source into two separate paths and recombine it into a common output path;
    c) OPD scanning means adapted for co-operating with the interferometer in scanning the OPD between the two separate paths;
    d) a photodetector for transducing the photometric radiation optically modulated at the Fourier frequencies by the interferometer with the aid of the OPD scanning means into an electrical output of interferometric data in the form of an interferogram;
    e) means for introducing cyclic spectrophotometric perturbations in the generation of said interferometric data enabling the time dependence of a material parameter that in operation will be subjected to analysis to be evaluated from the effect of the said perturbations on said interferometric data;

f) signal generating means for generating a time reference signal in phase with the perturbations and a time reference signal in quadrature with the perturbations;

g) means for reading, at each OPD point of the interferometer during each of a predetermined sequence of OPD scans, sets of values each set comprising an interferometric data value and the value of each of the in phase and the in quadrature reference signals occurring concurrently with said data value;

h) means for computing in correspondence of each OPD point in turn from the reading of the sets of values certain defining parameters linked by an equation and chosen to define the time dependence of the parameter to be analysed, and for generating the interferogram of each of said defining parameters.

2. A spectrophotometer as claimed in claim 1, wherein the means for computing are adapted for arranging the sets of values as a best fit to a model defined by said equation and are further adapted for deriving in correspondence of each OPD point, from the sets of values fitting the model, each of the defining parameters.

3. A spectrophotometer as claimed in claim 2, wherein:

a) the OPD scanning means is controlled to provide in operation at least three scans per OPD point;

b) the reading means are adapted for reading three sets of values;

c) the computing means include means for finding the best fit of the three sets of values to a model the equation of which is represented by:

$$CI = A + B \cos \theta + C \sin \theta$$

wherein:

CI is an interferometric data value;
A is a constant term of CI unaffected by the cyclic perturbations;
B is the term of CI in phase with the perturbations;
C is the term of CI in quadrature with the perturbations; and
Theta is the phase angle value of the perturbations; the equation thus defining a model in the form of an ellipse, the said computing means further including means for deriving a plurality of terms from a set of values generated in a first scan and for updating each term by adding to it the equivalent term as likewise derived in the second scan and each of subsequent scans, and means for arranging the plurality of terms accrued upon completion of all scans as the coefficients in a set of simultaneous equations in which A, B and C represent the unknown, and means for solving the said equations and obtaining the defining parameters A, B, and C.

4. A spectrophotometer as claimed in claim 3, wherein the means for computing are adapted for generating any one required spectrum of the defining parameters by Fourier interferogram-transformation.

5. A spectrophotometer as claimed in any one of claims 1 to 4, wherein means are included for locating an analytical sample in spaced relation to the interferometer for the purpose of establishing the time dependence of a sample parameter.

6. A spectrophotometer as claimed in claim 5, wherein the means for introducing cyclic perturbations is adapted for subjecting an analytical sample to cyclic mechanical perturbations such as in the form of cycles of alternate stretching and relaxing.

7. A spectrophotometer as claimed in claim 6, wherein the means for introducing cyclic perturbations is a rheometer.

8. A spectrophotometer as claimed in claim 7, wherein the signal generating means include means for generating the in phase reference signal in response to the strain to which the sample is subjected, in operation, by the rheometer.

9. A spectrophotometer as claimed in claim 8, wherein the signal generating means include means for deriving the in quadrature reference signal from the in phase reference signal.

10. A spectrophotometer as claimed in claim 6, wherein the spectrophotometer further includes a linear polarizer followed by an ultrasonic polarization modulator in order to adapt the spectrophotometer for time-resolved spectroscopy in accordance with the DIRLD (Dynamic Infra-Red Linear Dichroism) technique wherein the parameter under analysis is the time dependence of the linear dichroism of the sample.

11. A spectrophotometer as claimed in any one of claims 1 to 4, wherein the means for reading the sets of values and the means for computing include a microprocessor.

12. A method of time resolved FT optical spectrophotometry for evaluating the time dependence of a spectrophotometric parameter under analysis, comprising the steps of:

a) subjecting the parameter to interferometric analysis by FT spectrophotometry to generate interferometric data in the form of an interferogram;

b) introducing cyclic spectrophotometric perturbations in the generation of said interferometric data enabling the time dependence of a material parameter to be evaluated from the effect of said perturbations on said interferometric data;

c) generating two time reference signals, one in phase and one in quadrature with the cyclic perturbations;

d) reading, at each OPD point of the interferometer during each of a predetermined sequence of OPD scans, sets of values, each set comprising an interferometric data value and the value of each of the in phase and in quadrature reference signals occurring concurrently with said data value;

e) computing in correspondence of each OPD point in turn from the reading of the sets of values certain defining parameters linked by an equation and chosen to define the time dependence of the parameter under analysis; and f) generating the interferogram of each of said defining parameters.

13. A method as claimed in claim 12, including the steps of:

a) arranging the sets of values as a best fit to a model defined by said equation;

b) deriving, in correspondence of each OPD point, from the sets of values fitting the model, each of the defining parameters.

14. A method as claimed in claim 13, wherein:

a) the predetermined sequence of OPD scans comprises at least three scans;

b) three sets of values are read at each OPD;

c) arranging the best fit involves the three sets of values;

d) the model is the ellipse and the said equation is:

$$CI = A + B\cos\theta + C\sin\theta$$

wherein:

CI is a read interferometric data value;

A is a constant term of CI unaffected by the cyclic perturbations;

B is a the term of CI in phase with the perturbations;

C is the term of CI in quadrature with the perturbations; and

Theta is the phase angle value of the perturbations;

the said method including the further steps of:

e) deriving a plurality of terms from a set of values generated in a first OPD scan;

f) updating each term by adding to it the equivalent term as likewise derived in the second scan and each of subsequent scans;

g) arranging the plurality of terms accrued upon completion of all scans as the coefficients in a set of simultaneous equations in which A, B and C represent the unknown; and h) solving the said equations and obtaining the defining parameters A, B, and C.

15. A method as claimed in claim 14, including the step of generating any required spectrum of the defining parameters by Fourier interferogram-transformation.

16. A method as claimed in any one of claims 12 to 15, including the step of subjecting an analytical sample to the said method and evaluating the time dependence of a parameter of said sample.

17. A method as claimed in claim 16, including the step of subjecting the sample to mechanical cyclic perturbations in the form of alternate stretching and relaxing of the sample.

18. A method as claimed in claim 17, comprising the steps of a) evaluating the linear dichroism of a dichroic analytical sample by the DIRLD technique;

b) applying the said method to derive the time dependence of the linear dichroism of the sample.

* * * * *